(12) United States Patent
Hiromura et al.

(10) Patent No.: US 11,472,382 B2
(45) Date of Patent: Oct. 18, 2022

(54) BRAKING CONTROL DEVICE FOR VEHICLE

(71) Applicant: ADVICS CO., LTD., Kariya (JP)

(72) Inventors: Tatsuya Hiromura, Anjo (JP); Yukio Mori, Kariya (JP); Masayuki Asano, Suntou-gun (JP)

(73) Assignee: ADVICS CO., LTD., Kariya (JP)

( * ) Notice: Subject to any disclaimer, the term of this patent is extended or adjusted under 35 U.S.C. 154(b) by 105 days.

(21) Appl. No.: 16/620,684

(22) PCT Filed: Jun. 29, 2018

(86) PCT No.: PCT/JP2018/024792
§ 371 (c)(1),
(2) Date: Dec. 9, 2019

(87) PCT Pub. No.: WO2019/004424
PCT Pub. Date: Jan. 3, 2019

(65) Prior Publication Data
US 2021/0139006 A1 May 13, 2021

(30) Foreign Application Priority Data
Jun. 30, 2017 (JP) .............................. JP2017-128725

(51) Int. Cl.
*B60T 8/172* (2006.01)
*B60T 8/171* (2006.01)
*B60T 8/74* (2006.01)

(52) U.S. Cl.
CPC .............. *B60T 8/172* (2013.01); *B60T 8/171* (2013.01); *B60T 8/74* (2013.01); *B60T 2201/06* (2013.01); *B60T 2250/04* (2013.01)

(58) Field of Classification Search
CPC . B60T 8/172; B60T 8/171; B60T 8/74; B60T 2201/06; B60T 2250/04;
(Continued)

(56) References Cited

U.S. PATENT DOCUMENTS 6,193,332 B1 * 2/2001 Ono ...................... B60T 7/122
188/DIG. 2
6,428,120 B1 * 8/2002 Holl ...................... B60T 7/122
303/191

(Continued)

FOREIGN PATENT DOCUMENTS

| JP | 2007-276500 A | 10/2007 |
| JP | 2010-137706 A | 6/2010 |
| JP | 2014-226975 A | 12/2014 |

OTHER PUBLICATIONS

International Search Report dated Aug. 28, 2018 in PCT/JP2018/024792 filed on Jun. 29, 2018, citing references AA, AP, and AQ therein, 1 page.

*Primary Examiner* — Babar Sarwar
(74) *Attorney, Agent, or Firm* — Oblon, McClelland, Maier & Neustadt, L.L.P.

(57) ABSTRACT

A control device is applied to a vehicle that has a braking device configured to be able to adjust the braking force applied to the vehicle. The control device has a stopping braking force imparting unit that controls the braking device in order to apply a stopping braking force to the vehicle, as a minimum value of the braking force required to keep the vehicle stopped. The control device also has a deviation quantity deriving unit that derives a deviation quantity between a state quantity of the vehicle obtained when the stopping braking force is applied to the vehicle by the stopping braking force imparting unit and an ideal value of the state quantity of the vehicle. The control device also has a stopping braking force updating unit that updates the stopping braking force on the basis of the deviation quantity derived by the deviation quantity deriving unit.

7 Claims, 7 Drawing Sheets

(58) Field of Classification Search
CPC .......... B60T 8/4872; B60T 7/22; B60T 7/122; B60T 8/174; Y10S 188/02
See application file for complete search history.

(56) References Cited

U.S. PATENT DOCUMENTS

| | | | | |
|---|---|---|---|---|
| 7,699,410 | B2* | 4/2010 | Beck | B60T 13/745 |
| | | | | 303/155 |
| 8,042,887 | B2* | 10/2011 | Yamamoto | B60T 13/686 |
| | | | | 303/3 |
| 8,880,288 | B2* | 11/2014 | Li | B60W 40/10 |
| | | | | 180/199 |
| 9,045,119 | B2* | 6/2015 | Burkert | B60T 8/245 |
| 9,126,597 | B2* | 9/2015 | Yu | B60T 7/122 |
| 10,253,871 | B2* | 4/2019 | Hose | B60W 50/14 |
| 10,654,459 | B2* | 5/2020 | Englert | B60T 10/00 |
| 2004/0183366 | A1* | 9/2004 | Kamiya | B60T 17/221 |
| | | | | 303/11 |
| 2007/0164607 | A1* | 7/2007 | Itoh | B60T 8/4872 |
| | | | | 303/155 |
| 2007/0228823 | A1* | 10/2007 | Kokubo | B60T 7/22 |
| | | | | 303/155 |
| 2009/0124457 | A1* | 5/2009 | Nitta | B60T 7/14 |
| | | | | 477/93 |
| 2010/0228460 | A1* | 9/2010 | Saito | B60T 7/12 |
| | | | | 701/70 |

* cited by examiner

BRAKING CONTROL DEVICE FOR VEHICLE

TECHNICAL FIELD

The present invention relates to a braking control device for a vehicle configured to adjust braking force to be applied to a vehicle by actuating a braking device.

BACKGROUND ART

PTL 1 discloses an example of a braking control device configured to set a brake pressure required to keep a vehicle stopped as a target holding pressure, and to keep the stop state by holding the brake pressure at the target holding pressure. As a braking device controlled by the braking control device, known is a device configured to actuate an electromagnetic valve disposed between a wheel cylinder provided to a wheel and a master cylinder, thereby keeping the brake pressure, which is a hydraulic pressure in the wheel cylinder, at the target holding pressure.

The brake pressure required to keep the stop is higher as a gradient of a road surface on which the vehicle in the stop state is located becomes greater. Also, in the braking device as described above, a brake fluid in the wheel cylinder flows out to the master cylinder via the electromagnetic valve, so that the brake pressure may be reduced. An amount of reduction in brake pressure increases as a stop duration becomes longer. Therefore, in the device disclosed in PTL 1, a road surface gradient is acquired on the basis of an output signal from an in-vehicle acceleration sensor and the like, and a tentative target holding pressure is set higher as the road surface gradient is greater. Also, a stop duration of the vehicle is estimated from the acquired road information, and a correction value is set greater as the estimated value of the stop duration is larger. Then, a sum obtained by adding the correction value to the tentative target holding pressure is derived as the target holding pressure.

CITATION LIST

Patent Literature

PTL 1: JP-A-2010-137706

SUMMARY OF INVENTION

Technical Problem

Like this, in the case in which the target holding pressure is set and the braking device is actuated on the basis of the target holding pressure when keeping the stop state, the target holding pressure may be set, on the assumption that various parameters to be used when deriving the target holding pressure are worst values. For example, there maybe an error between the road surface gradient acquired on the basis of the output signal from the acceleration sensor and the like and an actual road surface gradient, due to variation and aging changes in sensor performance. For this reason, assuming that the error has occurred between the acquired value and actual value of the road surface gradient, the tentative target holding pressure is set. As a result, the target holding pressure set based on the tentative target holding pressure becomes higher than a minimum value of the brake pressure required to keep the stop state.

In a case in which the braking device is actuated based on the target holding pressure, an excessive brake pressure is applied to each wheel when stopping the vehicle, and the actuation time and actuation frequency of the braking device increase, so that a passenger in the vehicle may feel uncomfortable. Therefore, there is a need for a braking control device fora vehicle capable of optimizing the braking force to be applied to the vehicle so as to keep the stop state.

Solution to Problem

In order to achieve the above object, there is provided a braking control device for a vehicle, which is to be applied to a vehicle having a braking device configured to be able to adjust braking force to be applied to the vehicle. The braking control device for a vehicle includes a stopping braking force imparting unit configured to control the braking device so as to apply stopping braking force to the vehicle, as a minimum value of the braking force required to keep the vehicle stopped, a deviation quantity deriving unit configured to derive a deviation quantity between a state quantity of the vehicle obtained in a state in which the stopping braking force is applied to the vehicle by the stopping braking force imparting unit and an ideal value of the state quantity of the vehicle, and a stopping braking force updating unit configured to update the stopping braking force on the basis of the deviation quantity derived by the deviation quantity deriving unit.

In the above configuration, the deviation quantity between the state quantity of the vehicle obtained in the state in which the stopping braking force is applied to the vehicle by the stopping braking force imparting unit and the ideal value of the state quantity of the vehicle is derived. Based on the deviation quantity, the stopping braking force to be applied to the vehicle is updated. The stopping braking force is learned in this way, so that the stopping braking force can be optimized. Therefore, it is possible to optimize the braking force that is to be applied to the vehicle so as to keep the stop state.

DESCRIPTION OF EMBODIMENTS

Hereinbelow, a control device 100 that is an embodiment of the braking control device for a vehicle will be described with reference to FIGS. 1 to 11.

Figure 1:
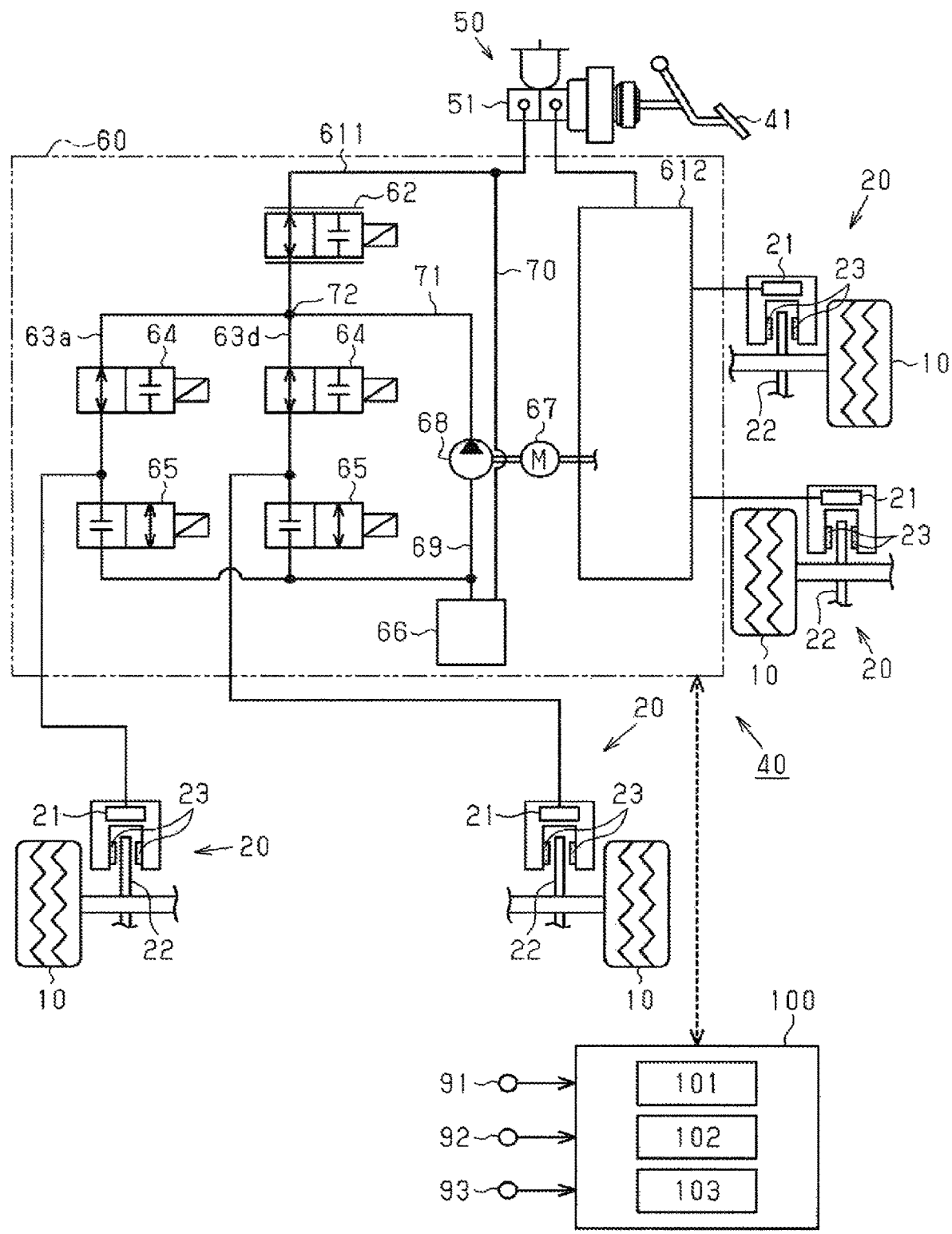
FIG. 1 depicts a functional configuration of a control device, which is an embodiment of a braking control device for a vehicle, and a schematic configuration of a braking device having the control device.

FIG. 1 depicts a braking device 40 configured to be able to adjust a braking force to be applied to a vehicle, and a control device 100 configured to actuate the braking device 40. The vehicle having the braking device 40 is provided with a plurality of braking mechanisms 20 each of which is provided to each wheel 10.

Each braking mechanism 20 includes a wheel cylinder 21 to which oil as a brake fluid is to be supplied, a disc rotor 22 that is an example of a rotary body configured to rotate integrally with the wheel 10, and a frictional material 23 configured to relatively move toward and away from the disc rotor 22. When a WC pressure Pwc, which is a hydraulic pressure in the wheel cylinder 21, increases as a result of supply of the brake fluid to the wheel cylinder 21, braking force corresponding to force of pressing the frictional material 23 to the disc rotor 22 is applied to the wheel 10. In this case, the force of pressing the frictional material 23 to the disc rotor 22 increases as the WC pressure Pwc becomes higher. That is, the braking force to the wheel 10 increases as the WC pressure Pwc in the corresponding wheel cylinder 21 is higher.

The braking device 40 includes a hydraulic pressure generating device 50 to which a braking operation member 41 such as a brake pedal to be operated by a driver is coupled, and a braking actuator 60 capable of individually adjusting the WC pressure Pwc in each wheel cylinder 21. A driver's operation on the braking operation member 41 may also be referred to as "braking operation", and force by which the driver operates the braking operation member 41 may also be referred to as "braking operation force".

The hydraulic pressure generating device 50 includes a master cylinder 51 that generates an MC pressure Pmc, which is a hydraulic pressure corresponding to the braking operation force, when the braking operation force is input.

The braking actuator 60 is provided with a first hydraulic pressure circuit 611 and a second hydraulic pressure circuit 612, as a two-system hydraulic pressure circuit. The first hydraulic pressure circuit 611 is connected with two wheel cylinders 21 of the respective wheel cylinders 21. The second hydraulic pressure circuit 612 is connected with the two remaining wheel cylinders 21. When the brake fluid flows from the hydraulic pressure generating device 50 into the first and second hydraulic pressure circuits 611 and 612, the brake fluid is supplied to the wheel cylinder 21.

In the first hydraulic pressure circuit 611, a fluid path configured to interconnect the master cylinder 51 and the wheel cylinder 21 is provided with a differential pressure regulation valve 62 that is a linear electromagnetic valve. Also, in the first hydraulic pressure circuit 611, a path 63*a* and a path 63*d* corresponding to the respective wheel cylinders 21 are provided on a side closer to the wheel cylinder 21 than the differential pressure regulation valve 62. Each of the paths 63*a* and 63*d* is provided with a holding valve 64 that is closed when regulating an increase in WC pressure Pwc and a pressure reducing valve 65 that is opened when reducing the WC pressure Pwc. In the meantime, the holding valve 64 is a normally open electromagnetic valve, and the pressure reducing valve 65 is a normally closed electromagnetic valve.

Also, the first hydraulic pressure circuit 611 is connected with a reservoir 66 configured to temporarily store the brake fluid flowing out from the wheel cylinder 21 via the pressure reducing valve 65, and a pump 68 configured to be actuated on the basis of drive of a pump motor 67. The reservoir 66 is connected to the pump 68 via a suction flow path 69, and is connected to the fluid path closer to the master cylinder 51 than the differential pressure regulation valve 62 via a master-side flow path 70. Also, the pump 68 is connected to a connection part 72 between the differential pressure regulation valve 62 and the holding valve 64 via a supply flow path 71. For this reason, while the pump motor 67 is driven, the pump 68 pumps up the brake fluid in the master cylinder 51 via the reservoir 66, and discharges the brake fluid to the connection part 72.

In the meantime, since a structure of the second hydraulic pressure circuit 612 is substantially the same as the structure of the first hydraulic pressure circuit 611, the description of the structure of the second hydraulic pressure circuit 612 is herein omitted.

As shown in FIG. 1, the control device 100 is connected with a hydraulic pressure sensor 91 for detecting the MC pressure Pmc in the master cylinder 51, a wheel speed sensor 92 for detecting a wheel speed that is a rotating speed of each wheel 10, and an acceleration sensor 93 for detecting an acceleration Gx that is a vehicle acceleration in a front and back direction.

The control device 100 is configured to calculate a wheel speed of the wheel, based on a signal output from the wheel speed sensor 92. Also, the control device 100 is configured to calculate a vehicle speed VS, which is a vehicle body speed, by using at least one of the wheel speeds of the respective wheels 10.

The control device 100 is configured to calculate an acceleration Gx in the front and back direction, based on a signal output from the acceleration sensor 93. The control device 100 is configured to calculate a road surface gradient RG, which is a calculated value of a gradient of the road surface on which the vehicle is located, based on the calculated acceleration Gx.

The control device 100 is configured to set a braking force instruction value, which is an instruction value of the braking force to be applied to the vehicle, and to execute automatic braking control of actuating the braking device 40, based on the braking force instruction value. That is, during the automatic braking control, the control device 100 is configured to convert the braking force instruction value into a hydraulic pressure instruction value PI, which is an instruction value for the WC pressure Pwc in each wheel cylinder 21. The hydraulic pressure instruction value PI is larger as the braking force instruction value becomes greater. The control device 100 is configured to actuate the braking device 40 so that the WC pressure Pwc is to be the hydraulic pressure instruction value PI.

In the meantime, as the automatic braking control, automatic stop control of adjusting the braking force applied to the vehicle to stop vehicle, and then keeping the stop state, and starting time control of reducing the braking force applied to the vehicle to start vehicle or to assist the start of the vehicle may be exemplified. Also, as the automatic braking control, stop auxiliary control of actuating the braking device 40 so as to keep the stop state even after the braking operation is released since the vehicle is stopped by a driver's braking operation may also be exemplified.

The control device 100 includes, as a functional unit for executing the automatic braking control, a stopping braking force imparting unit 103, a stopping braking force updating unit 101, and a deviation quantity deriving unit 102.

The stopping braking force imparting unit 103 is configured to control the braking device 40 by setting a stopping hydraulic pressure PS as the hydraulic pressure instruction value PI so as to set the WC pressure Pwc in the wheel cylinder 21 to the stopping hydraulic pressure PS. The stopping hydraulic pressure PS is the hydraulic pressure instruction value PI so as to apply the stopping braking force, which is a minimum value of the braking force required to keep the vehicle stopped, to the vehicle.

The deviation quantity deriving unit 102 is configured to derive a deviation quantity between a state quantity of the vehicle obtained in a state in which the stopping braking force is applied to the vehicle by the stopping braking force imparting unit 103 and an ideal value of the state quantity of the vehicle. For example, the deviation quantity deriving unit 102 is configured to calculate, as the deviation quantity, a deviation quantity between the stopping hydraulic pressure PS set by the stopping braking force imparting unit 103 and an ideal stopping hydraulic pressure PO that is an ideal value of the stopping hydraulic pressure PS. The ideal stopping hydraulic pressure PO is an actual value of a minimum value of the WC pressure Pwc required to stop the vehicle, considering a current state of the vehicle. In the meantime, the ideal stopping hydraulic pressure PO is a value correlated with the ideal value of the stopping braking force.

The stopping braking force updating unit 101 is configured to update the stopping hydraulic pressure PS so as to make the stopping hydraulic pressure PS approximate to the ideal value for applying the braking force required to keep the vehicle stopped to the vehicle. For example, when the deviation quantity is derived by the deviation quantity deriving unit 102, the stopping hydraulic pressure PS is updated on the basis of the deviation quantity. The stopping braking force imparting unit 103 controls the braking device 40 by setting the updated stopping hydraulic pressure PS as the hydraulic pressure instruction value PI.

An example in which the automatic stop control is executed to stop the vehicle and then to keep the stop state is described with reference to FIG. 2. The example of FIG. 2 indicates an example in which the road surface on which the vehicle is located is a horizontal road surface.

Figure 2:
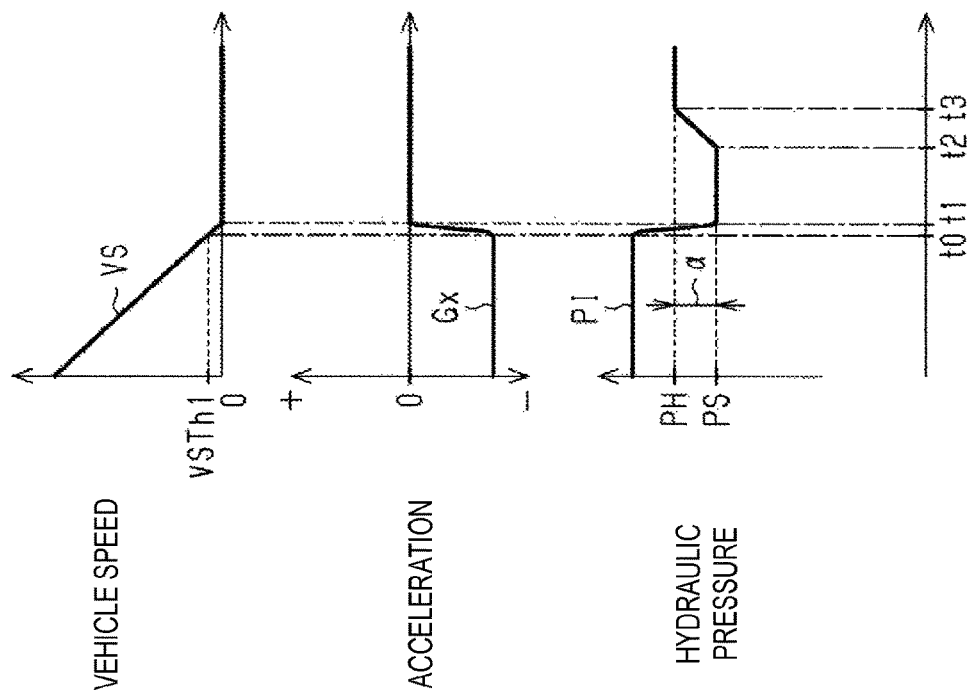
FIG. 2 is a timing chart at the time when automatic stop control is executed by the control device.

As shown in FIG. 2, while the automatic stop control is executed, the actuation of the braking mechanism 20 is controlled, based on the hydraulic pressure instruction value PI correlated with the braking force instruction value. When the vehicle is not stopped yet, the hydraulic pressure instruction value PI is set on the basis of a target acceleration of the vehicle. Then, the actuations of the differential pressure regulation valve 62 and the pump 68 of the braking actuator 60 are controlled so that the WC pressure Pwc in the wheel cylinder 21 is to be the hydraulic pressure instruction value PI.

When the vehicle speed VS reaches a vehicle speed VSTh1 at timing t0 immediately before the stop, it can be determined that the vehicle is in a state immediately before the stop. For this reason, the hydraulic pressure instruction value PI decreases toward the stopping hydraulic pressure PS after timing t0. Meanwhile, in the example of FIG. 2, the vehicle stops at timing t1. That is, at timing t1, the vehicle state shifts from a traveling state in which the vehicle is not stopped to a stop state in which the vehicle is stopped. For this reason, the hydraulic pressure instruction value PI decreases until timing t1 so that the hydraulic pressure instruction value PI is to be the same as the stopping hydraulic pressure PS. In the meantime, for example, when the vehicle speed VS becomes not more than a stop determination value VSTh2 smaller than the vehicle speed VSTh1 immediately before the stop, it can be determined that the vehicle is stopped.

Also, when the hydraulic pressure instruction value PI decreases in this way, an opening instruction value to the differential pressure regulation valve 62 while the pump 68 is continuously actuated becomes larger, in correspondence to the decrease in hydraulic pressure instruction value PI. Thereby, the WC pressure Pwc in the wheel cylinder 21 decreases, in correspondence to the decrease in hydraulic pressure instruction value PI.

From timing t1 to timing t2, since the hydraulic pressure instruction value PI is held at the stopping hydraulic pressure PS, the WC pressure Pwc is held at the stopping hydraulic pressure PS or a value close to the stopping hydraulic pressure PS. After timing t2, the hydraulic pressure instruction value PI is set to a holding hydraulic pressure PH higher than the stopping hydraulic pressure PS. For example, the holding hydraulic pressure PH is a value that is the same as a sum obtained by adding an offset value α to the stopping hydraulic pressure PS. The offset value α is a value that takes into account that the brake fluid in the wheel cylinder 21 flows out to the master cylinder 51 via the differential pressure regulation valve 62. When the hydraulic pressure instruction value PI is changed in this way, the opening instruction value to the differential pressure regulation valve 62 is reduced, so that the WC pressure Pwc increases. When the WC pressure Pwc reaches the holding hydraulic pressure PH at timing t3, the actuation of the pump 68 is stopped in a state in which the opening instruction value to the differential pressure regulation valve 62 is held. Thereby, even after timing t3, the WC pressure Pwc is held at the holding hydraulic pressure PH or a value close to the holding hydraulic pressure PH. Also, when it is estimated that the stop duration of the vehicle is shorter than a predetermined time period, the offset value a may not be added to the stopping hydraulic pressure PS. The predetermined time period is a time period in which an amount of the outflow of the brake fluid from the wheel cylinder 21 to the master cylinder 51 is negligibly small. The stop duration can be estimated, based on traffic information about a traveling destination of the vehicle, the braking operation force, and the like.

Like this, in a case in which the hydraulic pressure instruction value PI is changed in the time period from timing t0 to timing t1 when stopping the vehicle, the acceleration Gx is changed, in correspondence to the decrease in hydraulic pressure instruction value PI. However, in the example of FIG. 2, the acceleration Gx is not changed immediately after timing t1 at which the vehicle is stopped. Also, in the example, since the vehicle is located on the horizontal road surface, the acceleration Gx after timing t1 is "0".

In the meantime, the vehicle body may swing back in the front and back direction when the vehicle is stopped. When the vehicle body swings back in the front and back direction, the acceleration Gx is changed. In contrast, in the example of FIG. 2, the acceleration Gx is not changed immediately after timing t1 at which the vehicle is stopped. Like this, a case in which the acceleration Gx is not changed immediately after the vehicle is stopped is referred to as 'ideal stop'. Hereinbelow, the ideal stop is referred to as "smooth stop" or "soft stop". To the contrary, a stop in which the acceleration Gx is largely changed immediately after the vehicle is stopped is referred to as "hard stop". The hard stop will be described in detail later.

In a case in which the vehicle can be enabled to make a smooth stop, it can be considered that the hydraulic pressure instruction value PI upon the stop, i.e., the stopping hydraulic pressure PS is substantially the same as the ideal value of the stopping hydraulic pressure PS.

Subsequently, an example in which the vehicle stopped on a downhill road is enabled to start by executing the starting time control is described with reference to FIG. 3.

Figure 3:
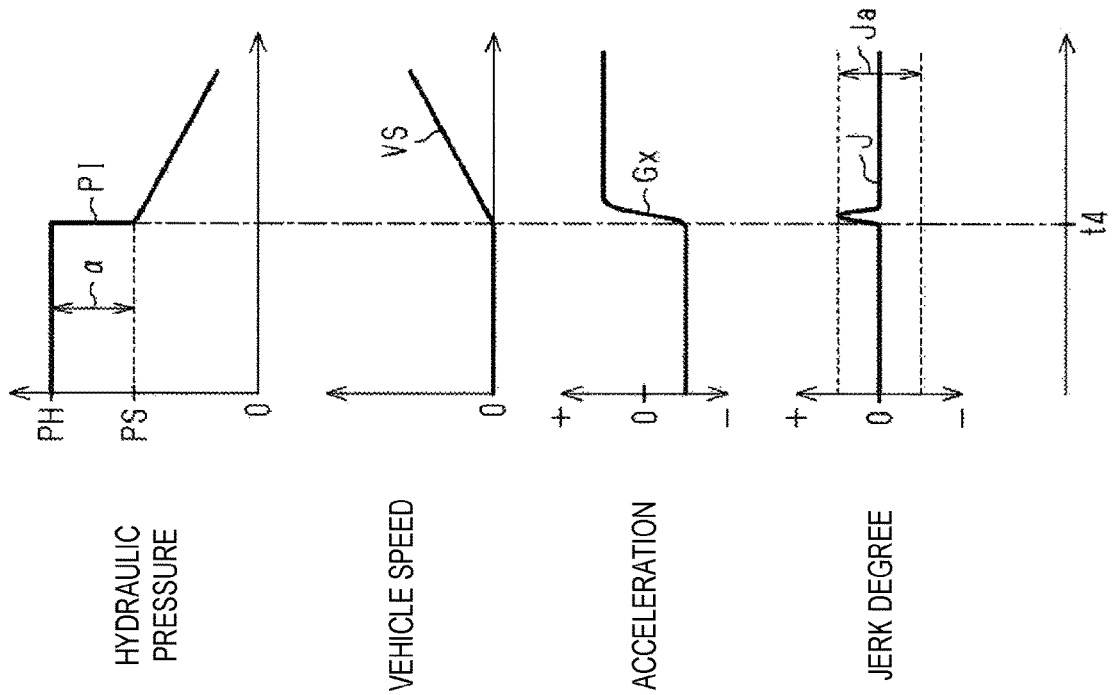
FIG. 3 is a timing chart at the time when starting time control is executed by the control device.

As shown in FIG. 3, the starting time control is executed from timing t4 at which the hydraulic pressure instruction value PI is held at the holding hydraulic pressure PH. Then, at timing t4, initial relief processing configuring the starting time control is executed. In the initial relief processing, the hydraulic pressure instruction value PI is changed from the holding hydraulic pressure PH to the stopping hydraulic pressure PS. The hydraulic pressure instruction value PI is reduced, so that the opening instruction value to the differential pressure regulation valve 62 of the braking actuator 60 is increased. Thereby, the WC pressure Pwc in the wheel cylinder 21 is rapidly reduced to the stopping hydraulic pressure PS or a value close to the stopping hydraulic pressure PS.

In the starting time control, when the initial relief processing is over, gradual change processing of gradually decreasing the hydraulic pressure instruction value PI is executed. During the gradual change processing, as the hydraulic pressure instruction value PI is deceased, the opening instruction value to the differential pressure regulation valve 62 is gradually increased. Thereby, the WC pressure Pwc is gradually decreased. When the starting time control of reducing the WC pressure Pwc is executed in this way while the vehicle is stopped on the downhill road, the vehicle starts.

In the present embodiment, a reduction rate of the hydraulic pressure instruction value PI in the gradual change processing is set to a value corresponding to a road surface gradient RG.

Figure 4:
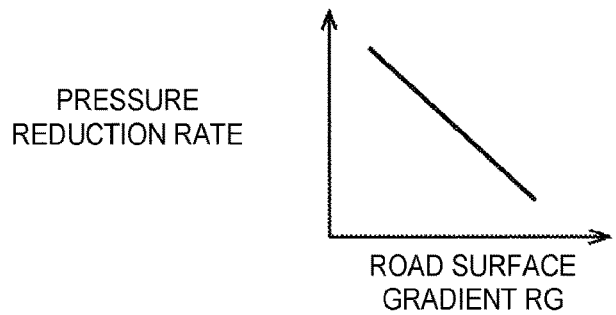
FIG. 4 depicts a relation between a road surface gradient and a pressure reduction rate of a hydraulic pressure that is supplied to the braking device during the starting time control.

FIG. 4 depicts a relation between the road surface gradient RG and the pressure reduction rate of the WC pressure Pwc. As shown in FIG. 4, in the present embodiment, the pressure reduction rate is set slower for the downhill road of which the road surface gradient RG is steeper. Thereby, since the braking force applied to the vehicle is more gently decreased on the steeper downhill road, it is possible to prevent the vehicle on the downhill road from suddenly starting.

In the example of FIG. 3, when the initial relief processing shifts to the gradual change processing and the hydraulic pressure instruction value PI becomes lower than the stopping hydraulic pressure PS, the vehicle starts. In this case, since the vehicle speed VS gently increases, the rapid change in acceleration Gx is prevented. As a result, a jerk degree J falls within an allowable jerk degree Ja. The allowable jerk degree Ja is set as an index for determining whether the vehicle has made an ideal start.

Herein, the ideal start of the vehicle indicates a start in which reaction time Ti after the execution of the initial relief processing is initiated (timing t4, in the example of FIG. 3) until the vehicle speed VS exceeds a start threshold value VSTh is within prescribed time and the jerk degree J upon the start is within a range of the allowable jerk degree Ja. Hereinbelow, the ideal start of the vehicle is referred to as "smooth start". On the other hand, when the reaction time Ti after the execution of the initial relief processing is initiated until the vehicle speed VS exceeds the start threshold value VSTh exceeds the prescribed time, it can be determined that a drag start has been made. Also, when the jerk degree J exceeds the allowable jerk degree Ja upon the start of the vehicle, it can be determined that a sudden start has been made. The sudden start and the drag start will be described in detail later.

A processing routine that is to be executed by the control device 100 when the vehicle is decelerated as a result of the execution of the automatic stop control is described with reference to FIG. 5. The processing routine is repeatedly executed every predetermined time.

When the processing routine is executed, it is determined in step S101 whether the vehicle is in a state immediately before the stop. For example, when the vehicle speed VS is equal to or less than the vehicle speed VSTh1 immediately before the stop, it can be determined that the vehicle is in a state immediately before the stop. When it is not determined that the vehicle is in a state immediately before the stop (S101: NO), the processing routine is ended.

On the other hand, when it is determined that the vehicle is in a state immediately before the stop (S101: YES), the processing proceeds to step S102. In step S102, it is determined whether there is a smooth stop history. In a case in which a record of the successful smooth stop is stored as a history in a memory of the control device 100, it can be determined that there is a smooth stop history. In the case in which the history is stored in the memory, a gradient of a road surface on which the vehicle is located upon the smooth stop and a soft stop hydraulic pressure PA, which is the stopping hydraulic pressure PS upon the smooth stop, are stored in association with each other in the memory.

When it is determined that there is no smooth stop history (S102: NO), the processing proceeds to step S103. On the other hand, when it is determined that there is a smooth stop history (S102: YES), the processing proceeds to step S107.

In step S107, a value of the soft stop hydraulic pressure PA is set as the stopping hydraulic pressure PS by the stopping braking force updating unit 101. Herein, in a case in which the road surface gradient RG, which is a gradient of the road surface on which the vehicle is currently located, is different from a value of the road surface gradient upon the successful smooth stop, the soft stop hydraulic pressure PA is corrected, in correspondence to a difference therebetween, and the corrected value of the soft stop hydraulic pressure PA is set as the stopping hydraulic pressure PS. Thereafter, the processing proceeds to step S108.

Meanwhile, in step S103, it is determined whether a correction flag is set ON. The correction flag is set ON, on condition that the smooth start could not be made by the starting time control, i.e., the sudden start or the drag start has been made. Also, the correction flag is set ON when the smooth stop has not been made, too. When the correction flag is set OFF (S103: NO), the processing proceeds to step S104. In step S104, an estimated hydraulic pressure Pe is calculated using a plant model of the vehicle, which will be described later, and then the processing proceeds to step S106. On the other hand, when the correction flag is set ON (S103: YES), the processing proceeds to step S105. In step S105, the estimated hydraulic pressure Pe is calculated using a corrected plant model of the vehicle, and then the processing proceeds to step S106. In step S106, a value of the estimated hydraulic pressure Pe is set as the stopping hydraulic pressure PS by the stopping braking force updating unit 101. Thereafter, the processing proceeds to step S108.

In step S108, the hydraulic pressure instruction value PI is changed to the stopping hydraulic pressure PS. Then, the processing proceeds to step S109. In step S109, it is determined whether the vehicle has stopped. When it is determined that the vehicle has not stopped (S109: NO), the processing of step S109 is repeatedly executed. On the other hand, when it is determined that the vehicle has stopped (S109: YES), the processing proceeds to step S110. In step S110, the hydraulic pressure instruction value PI is changed to the holding hydraulic pressure PH, and then the processing proceeds to step S111. In step S111, it is determined whether the vehicle has made a smooth stop. The determination as to whether the vehicle has made a smooth stop will be described later. When it is determined that the vehicle has not made a smooth stop (S111: NO), the processing proceeds to step S112. In step S112, the correction flag is set ON. Then, the processing routine is over. On the other hand, when the vehicle has made a smooth stop (S111: YES), the processing proceeds to step S113. In step S113, the stopping hydraulic pressure PS set in step S107 or step S106 is stored in the memory, as the soft stop hydraulic pressure PA. Then, the processing routine is over.

In the meantime, the smooth stop history is deleted from the memory when a change in weight of the vehicle is detected or when it is determined that there is a possibility that the weight of the vehicle has changed. Also, the correction flag is set OFF when a change in weight of the vehicle is detected or when it is determined that there is a possibility that the weight of the vehicle has changed. For example, when a door or window of the vehicle is opened during the stop, it may be determined that the weight of the vehicle has changed.

Subsequently, an example of a method of determining whether the vehicle has made a smooth stop is described with reference to FIG. 6, together with operations that are performed when stopping the vehicle by the automatic stop control. In the meantime, FIG. 6 depicts a timing chart at the time when the vehicle on the horizontal road surface has made a hard stop by the automatic stop control.

Figure 6:
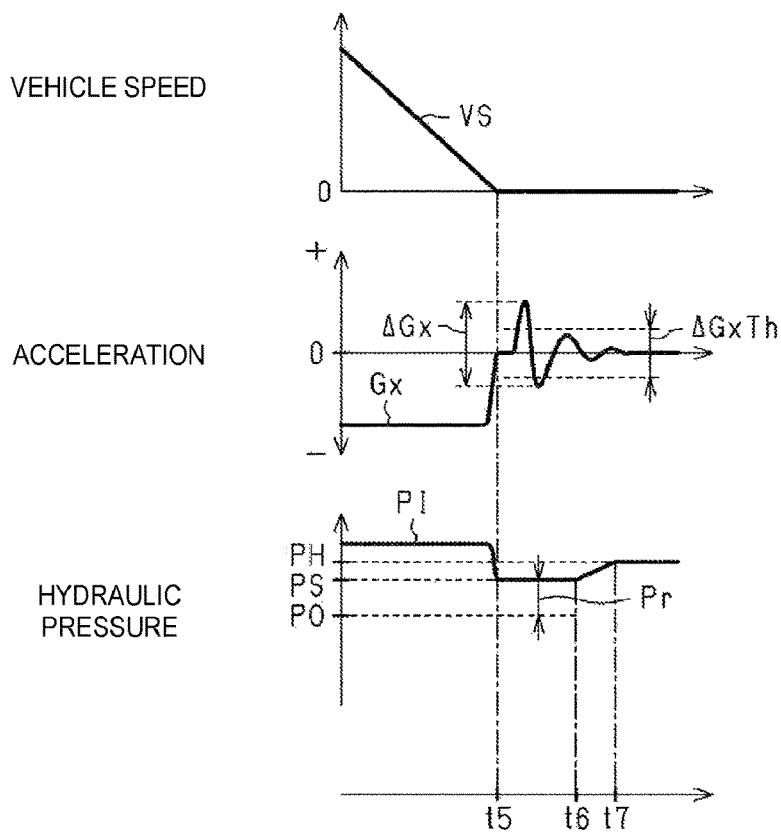
FIG. 6 is a timing chart at the time when the automatic stop control is executed by the control device.

As shown in FIG. 6, when the automatic stop control is initiated, the WC pressure Pwc in each wheel cylinder 21 is adjusted by the actuation of the braking actuator 60, so that the vehicle is decelerated. When the vehicle is about to stop, i.e., is in a state slightly before timing t5, the hydraulic pressure instruction value PI is changed to the stopping hydraulic pressure PS. Then, the actuation of the braking actuator 60 based on the hydraulic pressure instruction value PI reduces and holds the WC pressure Pwc at the stopping hydraulic pressure PS or a value close to the stopping hydraulic pressure PS. Then, the vehicle stops at timing t5.

In the example of FIG. 6, the stopping hydraulic pressure PS is set higher than an ideal stopping hydraulic pressure PO, which is an ideal value of the stopping hydraulic pressure PS. For this reason, for the smooth stop, the vehicle stops in a state in which the excessive braking force is applied to the vehicle. As a result, the high swing back is generated for the vehicle immediately after the stop. In the example of FIG. 6, the acceleration Gx converges while repeating increase and decrease after it once becomes "0" at timing t5.

Therefore, for example, a difference between a minimum value and a maximum value of the acceleration Gx when the acceleration Gx is being varied immediately after the stop is calculated as a variation width ΔGx of the acceleration Gx. When the variation width ΔGx is less than a variation width determination value ΔGxTh, it may be determined that the vehicle has made a smooth stop, and when the variation width ΔGx is equal to or greater than the variation width determination value ΔGxTh, it may be determined that the vehicle has made a hard stop.

In the example of FIG. 6, the hydraulic pressure instruction value PI increases toward the holding hydraulic pressure PH from timing t6 to timing t7 after the stop.

Subsequently, a processing routine, which is to be executed by the control device 100 when the vehicle is enabled to start by the starting time control, is described with reference to FIG. 8. The processing routine is repeatedly executed every predetermined time.

When the processing routine is executed, it is first determined in step S201 whether the vehicle is stopped. When it is determined that the vehicle is not stopped (S201: NO), the processing routine is once ended.

On the other hand, when it is determined that the vehicle is stopped (S201: YES), the processing proceeds to step S202. In step S202, it is determined whether the road surface on which the vehicle is located is a downhill road. The determination as to whether or not the downhill road may be made using the road surface gradient RG calculated based on the acceleration Gx, for example. When it is determined that the road surface is not a downhill road (S202: NO), the processing routine is once ended. On the other hand, when it is determined that the road surface is a downhill road (S202: YES), the processing proceeds to step S203. In the present embodiment, the processing (S201) of determining whether the vehicle is stopped is executed before the processing (S202) of determining whether the road surface is a downhill road. However, the processing of determining whether the road surface is a downhill road may be executed before the processing of determining whether the vehicle is stopped.

In step S203, it is determined whether the smooth stop history is stored in the memory. When it is determined that the smooth stop history is not stored in the memory, there is a possibility that the current weight of the vehicle has changed from the vehicle weight upon the previous stop.

When it is determined that the smooth stop history is stored in the memory (S203: YES), the processing proceeds to step S208.

In step S208, the value of the soft stop hydraulic pressure PA stored in the memory of the control device 100 is set as the stopping hydraulic pressure PS. Herein, when the road surface gradient RG, which is a gradient of the road surface on which the vehicle is currently located, is different from the value of the road surface gradient upon the successful smooth stop, the soft stop hydraulic pressure PA is corrected, in correspondence to a difference therebetween, and the corrected value of the soft stop hydraulic pressure PA is set as the stopping hydraulic pressure PS. Then, the processing proceeds to step S209.

On the other hand, when it is determined in step S203 that the smooth stop history is not stored in the memory (S203: NO), the processing proceeds to step S204. In step S204, it is determined whether the correction flag is set ON. The correction flag is set in step S211 or step S212, which will be described later. When it is determined that the correction flag is set OFF (S204: NO), the processing proceeds to step S205. In step S205, the estimated hydraulic pressure Pe is calculated using the plant model of the vehicle, which will be described later, and then the processing proceeds to step S207. On the other hand, when it is determined that the correction flag is set ON (S204: YES), the processing proceeds to step S206. In step S206, the estimated hydraulic pressure Pe is calculated using the corrected plant model of the vehicle, and then the processing proceeds to step S207. In step S207, the value of the estimated hydraulic pressure Pe is set as the stopping hydraulic pressure PS by the stopping braking force updating unit 101. Then, the processing proceeds to step S209.

In step S209, the hydraulic pressure instruction value PI is changed to the stopping hydraulic pressure PS by the initial relief processing, and then the processing proceeds to step S210. In step S210, the gradual change processing is executed, i.e., the reduction in hydraulic pressure instruction value PI is initiated, and then the processing proceeds to step S211.

In step S211, it is determined whether the vehicle has made a smooth start. When it is determined that the vehicle has not made a smooth start (S211: NO), the processing proceeds to step S212, and the correction flag is set ON. Then, the processing proceeds to step S214. On the other hand, when it is determined that the vehicle has made a smooth start (S211: YES), the processing proceeds to step S213, and the correction flag is set OFF. Then, the processing proceeds to step S214.

In step S214, it is determined whether the hydraulic pressure instruction value PI is "0". When it is determined that the hydraulic pressure instruction value PI is not "0" (S214: NO), it can be determined that the braking force is still applied to the vehicle. Therefore, the determination of step S214 is repeatedly executed. On the other hand, when it is determined that the hydraulic pressure instruction value PI is "0" (S214: YES), it can be determined that the braking force is not applied to the vehicle. Therefore, the processing routine is once ended. That is, the starting time control is over.

Subsequently, operations at the time when the smooth start has not been made by the starting time control are described with reference to FIGS. 9 and 10.

Figure 9:
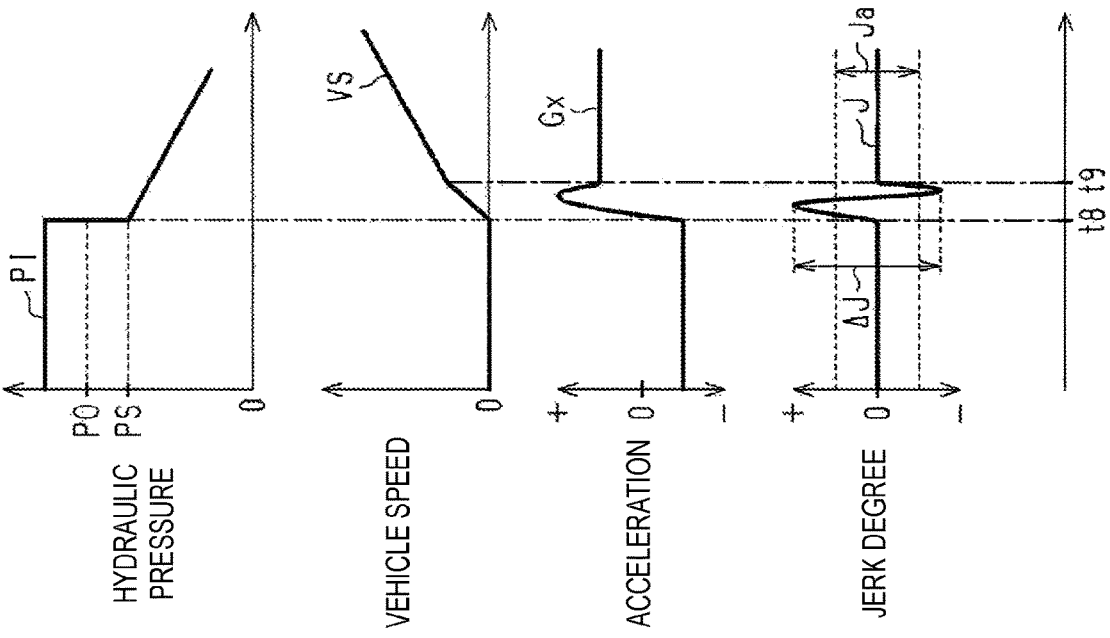
FIG. 9 is a timing chart at the time when the starting time control is executed by the control device.

FIG. 9 is a timing chart at the time when the vehicle has made a sudden start. As shown in FIG. 9, when the stopping hydraulic pressure PS is lower than the ideal stopping hydraulic pressure PO, the vehicle may suddenly start. When the starting time control is initiated at timing t8, since the hydraulic pressure instruction value PI is changed to the stopping hydraulic pressure PS by the initial relief processing, the WC pressure Pwc in the wheel cylinder 21 is rapidly reduced toward the stopping hydraulic pressure PS. In this case, the hydraulic pressure instruction value PI falls below the ideal stopping hydraulic pressure PO, i.e., the ideal value of the stopping hydraulic pressure PS at timing t8. For this reason, the vehicle starts while the braking force applied to the vehicle is rapidly reduced. As a result, the vehicle speed VS rapidly increases and the acceleration Gx rapidly changes from timing t8 to timing t9. For this reason, the jerk degree J is varied to exceed the range of the allowable jerk degree Ja from timing t8 to timing t9. Like this, when a variation width ΔJ of the jerk degree J is greater than the allowable jerk degree Ja, it can be determined that this start of the vehicle is a sudden start, not a smooth start.

Figure 10:
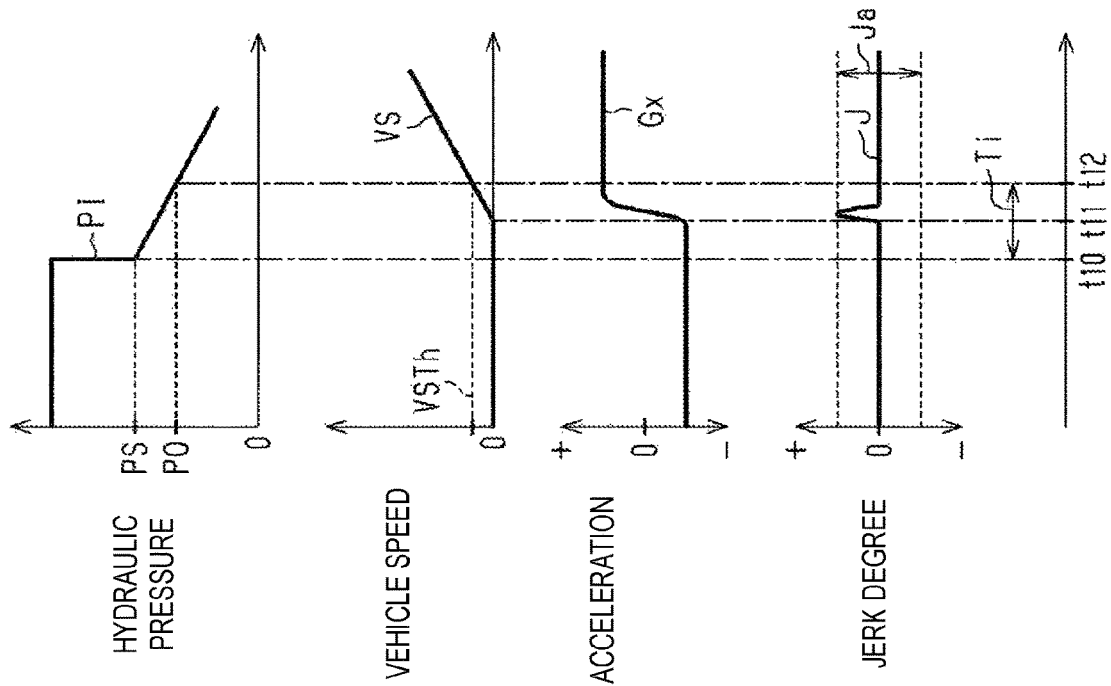
FIG. 10 is a timing chart at the time when the starting time control is executed by the control device.

FIG. 10 is a timing chart at the time when the vehicle has made a drag start. As shown in FIG. 10, when the stopping hydraulic pressure PS is higher than the ideal stopping hydraulic pressure PO, the vehicle may make a drag start. When the starting time control is initiated at timing t10, since the hydraulic pressure instruction value PI is changed to the stopping hydraulic pressure PS by the initial relief processing, the WC pressure Pwc in the wheel cylinder 21 is rapidly reduced toward the stopping hydraulic pressure PS. In this case, even when the processing proceeds from the initial relief processing to the gradual change processing, the WC pressure Pwc is still higher than the ideal stopping hydraulic pressure PO. For this reason, even when the reduction in stopping hydraulic pressure PS by the gradual change processing reduces the WC pressure Pwc, the vehicle does not start easily. When the hydraulic pressure instruction value PI, i.e., the WC pressure Pwc reaches the ideal stopping hydraulic pressure PO at timing t11, the vehicle starts. Then, at timing t12 after timing at which the prescribed time has elapsed from timing t10, which is initiation timing of the initial relief processing, the vehicle speed VS reaches the start threshold value VSTh. That is, in the example of FIG. 10, time from timing t10 to timing t12 is the reaction time Ti. In this case, although the variation width ΔJ of the jerk degree J immediately after the vehicle start does not exceed the allowable jerk degree Ja, the reaction time Ti exceeds the prescribed time. For this reason, it can be determined that this start of the vehicle is a drag start, not a smooth start.

Subsequently, the calculation of the estimated hydraulic pressure Pe by using the plant model of the vehicle is described with reference to FIG. 7.

A plant model 104 is to output an estimated value of a value indicative of a vehicle behavior on the basis of characteristics of the vehicle when a state quantity of the vehicle, which is a value indicative of a current state of the vehicle, is input. In the example of FIG. 7, as the state quantity of the vehicle, the hydraulic pressure instruction value PI, the vehicle speed VS, and the road surface gradient RG are input. Then, a front and back pitch amount G of the vehicle is output from the plant model 104, as an example of a value indicative of the vehicle behavior.

The front and back pitch amount G corresponds to a value of the acceleration Gx of the vehicle. When the hydraulic pressure instruction value PI input to the plant model 104 is the same as the ideal value of the stopping hydraulic pressure, the front and back pitch amount G is "0". On the other hand, when the hydraulic pressure instruction value PI input to the plant model 104 is greater than the ideal stopping hydraulic pressure PO, the greater a deviation quantity between the hydraulic pressure instruction value PI and the ideal stopping hydraulic pressure PO is, the greater the front and back pitch amount G is. In other words, the greater the front and back pitch amount G is, the greater the deviation quantity between the hydraulic pressure instruction value PI and the ideal stopping hydraulic pressure PO is.

The front and back pitch amount G output from the plant model 104 is converted into an extra hydraulic pressure Pr. Specifically, the extra hydraulic pressure Pr is set to a higher value as the front and back pitch amount G is larger. That is, the extra hydraulic pressure Pr can be said as a value correlated with the deviation quantity between the state quantity of the vehicle and the ideal value of the state quantity of the vehicle. Therefore, the setting of the extra hydraulic pressure Pr by using the plant model 104 is performed by the deviation quantity deriving unit 102.

The estimated hydraulic pressure Pe can be derived from a difference obtained by subtracting the extra hydraulic pressure Pr from the hydraulic pressure instruction value PI input to the plant model 104. Therefore, the calculation of the estimated hydraulic pressure Pe by using the hydraulic pressure instruction value PI and the extra hydraulic pressure Pr is performed by the stopping braking force updating unit 101.

To the plant model 104, a correction term K1 may also be input, in addition to the state quantity of the vehicle. The correction term K1 is to approximate an output value of the plant model 104 to an actual behavior of the vehicle based on current characteristics of the vehicle, considering variation in performance of the vehicle acceleration and aging changes in performance of the differential pressure regulation valve 62 of the braking actuator 60 and variation in performance and aging changes in output of the acceleration sensor 93.

For example, the correction term K1 can be set greater as the variation width ΔGx (refer to FIG. 6) of the acceleration Gx upon the hard stop of the vehicle is greater. Also, the correction term K1 can be set greater as the variation width ΔJ (refer to FIG. 9) of the jerk degree J upon the sudden start of the vehicle is greater. Also, the correction term K1 can be set greater as the reaction time Ti (refer to FIG. 10) upon the drag start of the vehicle is longer.

The correction term K1 is input to the plant model 104 after being corrected in accordance with reliability for the value set as described above. That is, when the reliability for the correction term K1 before correction is low, the correction term K1 is input to the plant model 104 after being multiplied by "0". On the other hand, when the reliability for the correction term K1 before correction is high, the correction term. K1 is input to the plant model 104 after being multiplied by a coefficient (greater than 0 and equal to or smaller than 1) corresponding to the reliability. The coefficient is greater as the reliability is higher. In the meantime, the reliability is initialized to "0" when the door or window of the vehicle is opened.

When the front and back pitch amount G is output by using the correction term K1, the front and back pitch amount G, i.e., the deviation quantity between the state quantity of the vehicle and the ideal value of the state quantity of the vehicle can be made smaller, as compared to a case in which the correction term K1 is not input to the plant model 104.

Figure 5:
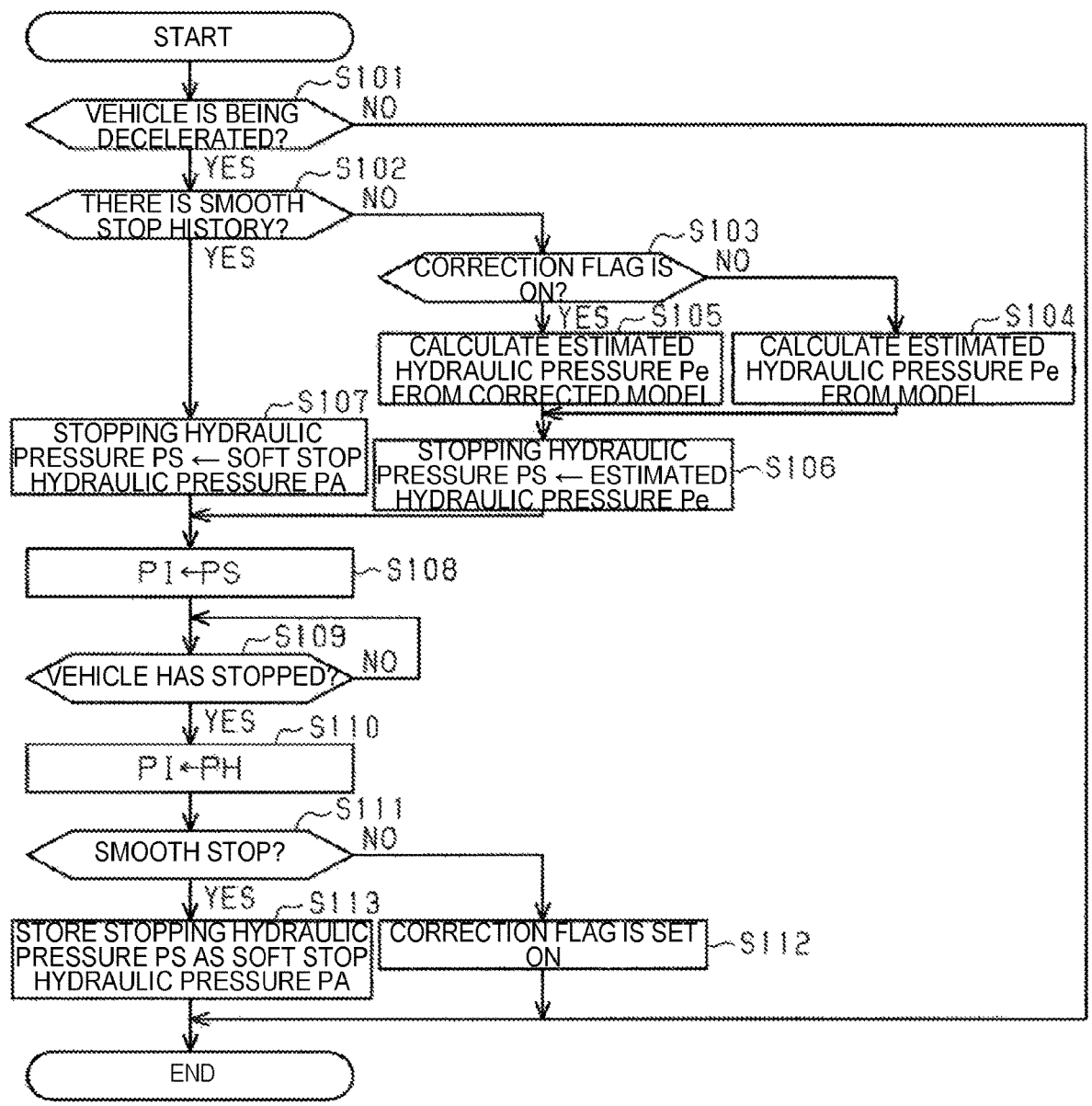
FIG. 5 is a flowchart depicting a processing routine of the automatic stop control that is to be executed by the control device.
Figure 8:
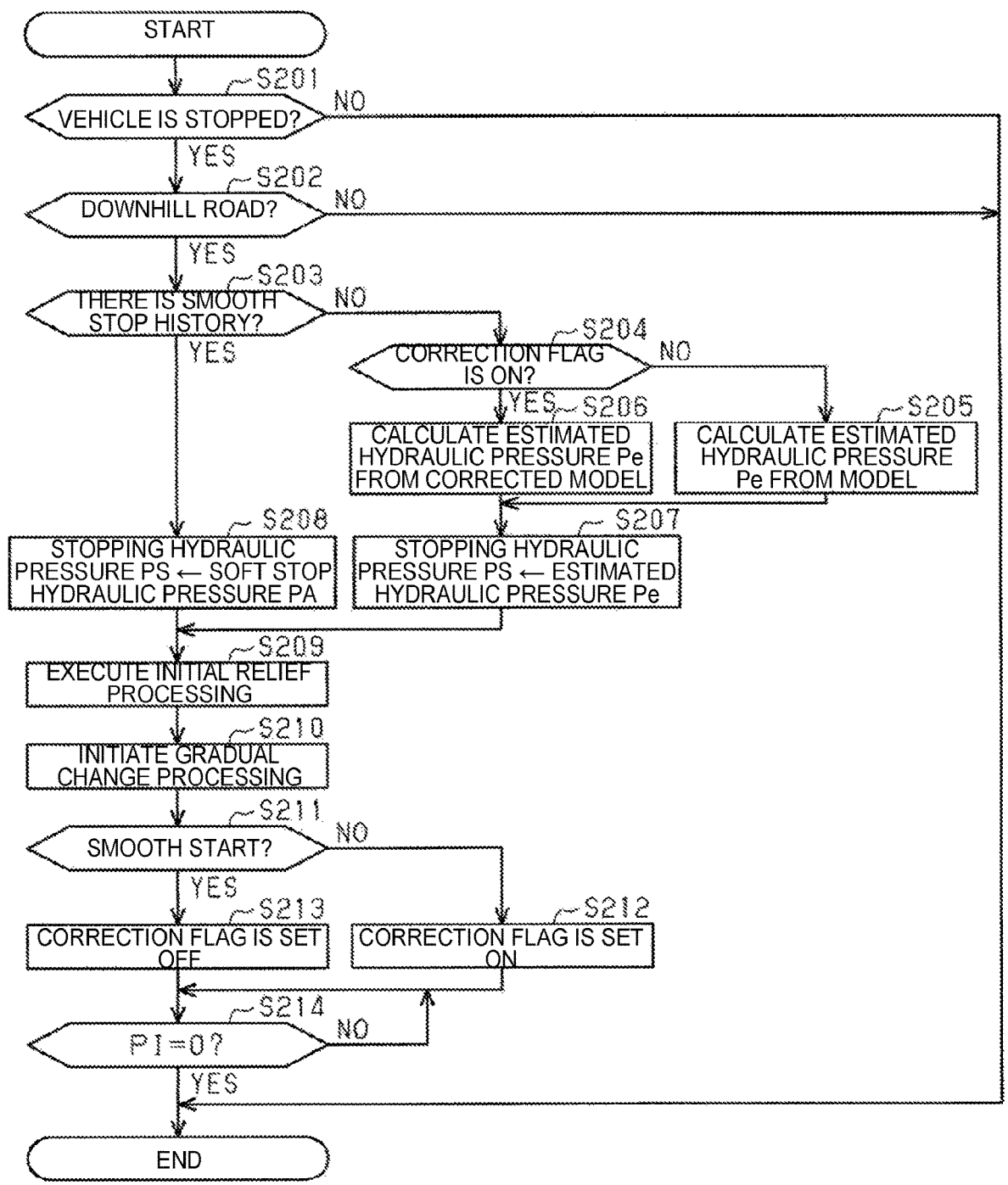
FIG. 8 is a flowchart depicting a processing routine of the starting time control that is to be executed by the control device.

In the present embodiment, in each of the processing routines shown in FIGS. 5 and 8, when calculating the estimated hydraulic pressure Pe in step S104 and step S205, the estimated hydraulic pressure Pe is derived, based on the front and back pitch amount G acquired without inputting the correction term K1 to the plant model 104. On the other hand, when calculating the estimated hydraulic pressure Pe in step S105 and step S206, the estimated hydraulic pressure Pe is derived, based on the front and back pitch amount G acquired by inputting the correction term K1 to the plant model 104.

Figure 7:
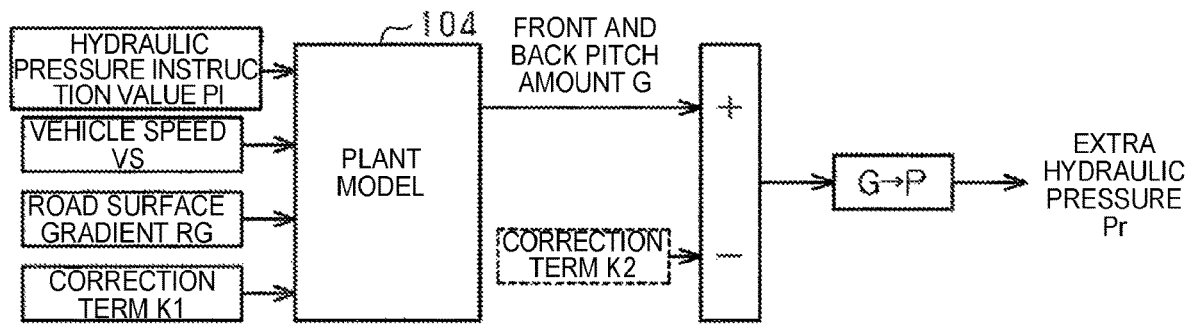
FIG. 7 is a block diagram depicting a plant model of a vehicle, which is used by the control device.

Herein, when the value of the extra hydraulic pressure Pr derived by using the plant model 104 shown in FIG. 7 is "0", it can be estimated that the stopping hydraulic pressure PS input to the plant model 104 is the ideal stopping hydraulic pressure PO. For this reason, when deriving the ideal stopping hydraulic pressure PO, the ideal stopping hydraulic pressure PO can be derived by adjusting the hydraulic pressure to be input to the plant model 104 so that the front and back pitch amount G is to be "0".

The operations and effects of the control device 100 in accordance with the present embodiment are described.

In the present embodiment, while executing the automatic braking control, the extra hydraulic pressure Pr correlated with the deviation quantity between the stopping hydraulic pressure PS and the ideal stopping hydraulic pressure PO is derived by using the plant model 104, based on the state quantity of the vehicle (for example, the hydraulic pressure instruction value PI, the vehicle speed VS and the road surface gradient RG) at the time when the hydraulic pressure instruction value PI is the same as the stopping hydraulic pressure PS. Based on the extra hydraulic pressure Pr, the estimated hydraulic pressure Pe is calculated. That is, the value of the estimated hydraulic pressure Pe is set as the stopping hydraulic pressure PS. In this way, the stopping hydraulic pressure PS is corrected on the basis of the latest state quantity of the vehicle, so that the stopping hydraulic pressure PS can be optimized.

In the meantime, when there is a deviation between the stopping hydraulic pressure PS and the ideal stopping hydraulic pressure PO, the deviation quantity is considered due to the variation and aging changes in performance of the differential pressure regulation valve 62 of the braking actuator 60 and the variation in performance and aging changes in output of the acceleration sensor 93. In that respect, in the present embodiment, when there is a deviation between the stopping hydraulic pressure PS and the ideal stopping hydraulic pressure PO, the correction term K1 is derived, based on the value indicative of the vehicle behavior due to the deviation (for example, the variation width ΔGx of the acceleration Gx, the variation width ΔJ of the jerk degree J, and the reaction time Ti). Then, the correction term K1 is also input to the plant model 104, so that the stopping hydraulic pressure PS is derived. Thereby, the stopping hydraulic pressure PS can be made closer to the ideal stopping hydraulic pressure PO, even if there is no experience of a smooth stop or a smooth start.

For example, while the automatic stop control is executed, when the vehicle is in a state immediately before the stop, the hydraulic pressure instruction value PI is set as the value of the stopping hydraulic pressure PS. At this time, when the stopping hydraulic pressure PS is higher than the ideal stopping hydraulic pressure PO, the vehicle makes a hard stop. After the hard stop in this way, when the starting time control is executed, for example, the correction term K1 is calculated, based on the variation width ΔGx of the acceleration Gx as the value indicative of the vehicle behavior upon the hard stop, and the estimated hydraulic pressure Pe is derived, based on the extra hydraulic pressure Pr derived by inputting the correction term K1 to the plant model 104. The value of the estimated hydraulic pressure Pe is set as the stopping hydraulic pressure PS, so that the stopping hydraulic pressure PS can be made close to the ideal stopping hydraulic pressure PO.

As a result, while the starting time control is executed, the hydraulic pressure instruction value PI is changed from the holding hydraulic pressure PH to the stopping hydraulic pressure PS by the initial relief processing, so that it is possible to prevent a sudden start of the vehicle, in other words, jackrabbit start of the vehicle. Also, it is possible to prevent a situation in which the vehicle hardly starts, i.e., the vehicle makes a drag start even though the initial relief processing shifts to the gradual change processing and the hydraulic pressure instruction value PI is thus gradually reduced. That is, it is possible to prevent the lowering in stability of the vehicle behavior upon the vehicle start.

When the vehicle is enabled to start on the downhill road by the starting time control, the vehicle may suddenly start. Like this, when the vehicle is not enabled to make a smooth start, the correction term K1 is derived, based on the variation width ΔJ of the jerk degree J upon the sudden start. The correction term K1 is also input to the plant model 104 to derive the extra hydraulic pressure Pr, and the estimated hydraulic pressure Pe is derived, based on the extra hydraulic pressure Pr. The value of the estimated hydraulic pressure Pe is set as the stopping hydraulic pressure PS, so that the stopping hydraulic pressure PS can be made close to the ideal stopping hydraulic pressure PO.

As a result, when executing the next automatic stop control, the actuation of the braking actuator 60 is controlled using the stopping hydraulic pressure PS derived in this way, so that it is possible to reduce the swing-back quantity upon the vehicle stop. That is, the vehicle can be easily enabled to make a smooth stop. Also, when executing the next automatic stop control, the actuation of the braking actuator 60 is controlled using the stopping hydraulic pressure PS derived in this way, so that it is possible to make it difficult for the vehicle to make a sudden start. That is, it is possible to prevent the lowering in stability of the vehicle behavior upon the vehicle stop and upon the vehicle start.

When the vehicle is enabled to start on the downhill road by the starting time control, the vehicle may make a drag start. Like this, when the vehicle is not enabled to make a smooth start, the correction term K1 is derived, based on the reaction time Ti that can be acquired upon the drag start. The correction term K1 is also input to the plant model 104 to derive the extra hydraulic pressure Pr, and the estimated hydraulic pressure Pe is derived, based on the extra hydraulic pressure Pr. The value of the estimated hydraulic pressure Pe is set as the stopping hydraulic pressure PS, so that the stopping hydraulic pressure PS can be made close to the ideal stopping hydraulic pressure PO.

As a result, when executing the next automatic stop control, the actuation of the braking actuator 60 is controlled using the stopping hydraulic pressure PS derived in this way, so that it is possible to reduce the swing-back quantity upon the vehicle stop. That is, the vehicle can be easily enabled to make a smooth stop. Also, when executing the next automatic stop control, the actuation of the braking actuator 60 is controlled using the stopping hydraulic pressure PS derived in this way, so that it is possible to make it difficult for the vehicle to make a drag start. That is, it is possible to prevent the lowering in stability of the vehicle behavior upon the vehicle stop and upon the vehicle start.

In the meantime, when deriving the extra hydraulic pressure Pr by using the correction term K1, the correction term K1 is input to the plant model 104 after being multiplied by the coefficient corresponding to the reliability. Thereby, when deriving the extra hydraulic pressure Pr, it is possible to prevent significant reflection of the value, which indicates the vehicle behavior (for example, the variation width ΔGx of the acceleration Gx, the variation width ΔJ of the jerk degree J, and the reaction time Ti) and is acquired in a situation in which the reliability is low such as a case in which the state quantity of the vehicle is accidentally changed. That is, it is possible to prevent the lowering in derivation accuracy of the extra hydraulic pressure Pr using the plant model 104.

In the present embodiment, in the case in which the smooth stop history is stored in the memory, the soft stop hydraulic pressure PA that is the stopping hydraulic pressure PS at that time can be set as the stopping hydraulic pressure PS. Thereby, when stopping the vehicle by the automatic stop control, the vehicle can be easily enabled to make a smooth stop. Also, when the vehicle is enabled to make a start on the downhill road by the starting time control, the vehicle is easily enabled to make a smooth start.

In the meantime, the minimum braking force required to keep the stop state is different depending on the road surface gradient RG. For this reason, in the present embodiment, when the gradient of the road surface on which the vehicle is currently located is different from the road surface gradient upon the successful smooth stop or upon the successful smooth start, the value of the estimated hydraulic pressure Pe derived by using the plant model 104 is set as the stopping hydraulic pressure PS, without setting the soft stop hydraulic pressure PA as the stopping hydraulic pressure PS. Thereby, when stopping the vehicle by the automatic stop control, the vehicle is easily enabled to make a smooth stop.

Also, when enabling the vehicle to start on the downhill road by the starting time control, the vehicle is easily enabled to make a smooth start.

For example, when the total weight of the vehicle is changed due to getting in and out of a passenger, loading or unloading of the luggage, and the like, the minimum braking force required to keep the stop state is changed. For this reason, when the soft stop hydraulic pressure PA stored before the change in weight is set as the stopping hydraulic pressure PS even after the change in weight or when the correction flag and the reliability set on the basis of the state quantity of the vehicle before the change in weight are used even after the change in weight, the estimated hydraulic pressure Pe derived using the plant model 104 may deviate from the ideal stopping hydraulic pressure PO. In that respect, in the present embodiment, when the change in total weight of the vehicle is detected or when it is determined that there is a possibility that the total weight has changed, the smooth stop history is deleted from the memory and the correction flag is set OFF, so that the reliability is initialized to "0". For this reason, it is possible to prevent the lowering in accuracy of the extra hydraulic pressure Pr derived using the plant model 104, i.e., the estimated hydraulic pressure Pe.

In the present embodiment, the stopping hydraulic pressure PS is learned during the starting time control and during the automatic stop control. Thereby, it is possible to secure a chance to derive the estimated hydraulic pressure Pe, and to increase the derivation accuracy of the estimated hydraulic pressure Pe.

Also, according to the control device 100 including the stopping braking force updating unit 101 configured to set the stopping hydraulic pressure PS as described above, when the stopping hydraulic pressure PS is used, it is possible to prevent the braking force applied upon the stop from being excessive, even during the stop auxiliary control executed in a situation in which the driver performs the braking operation. The stop auxiliary control is described with reference to FIG. 11.

Figure 11:
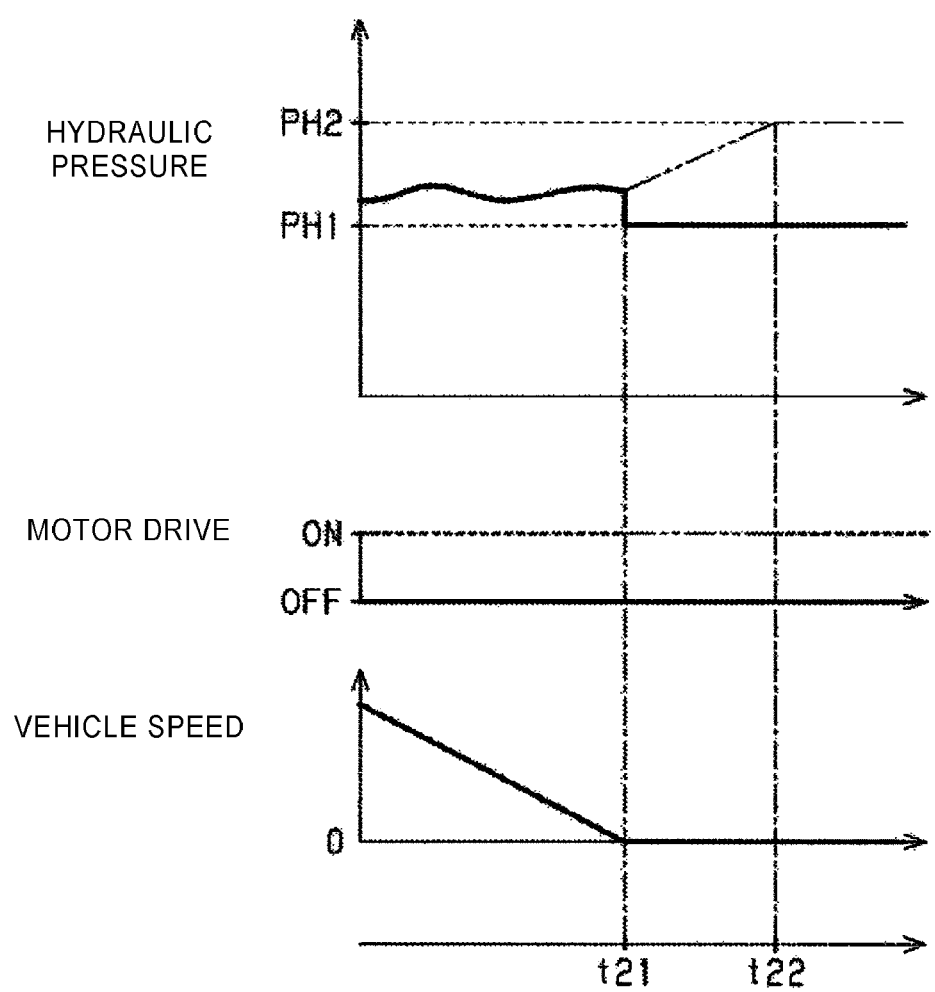
FIG. 11 is a timing chart at the time when stop auxiliary control is executed by the control device.

FIG. 11 depicts a timing chart at the time when the vehicle stop is assisted by the stop auxiliary control executed by the control device 100. In FIG. 11, a case of the present embodiment is shown with the solid line, and a case of Comparative Example is shown with the dashed-two dotted line. In the meantime, the case of the present embodiment is a case in which the stopping hydraulic pressure PS is made to be the same as the ideal stopping hydraulic pressure PO through the learning of the estimated hydraulic pressure Pe by using the plant model 104. On the other hand, the case of Comparative Example is a case in which the stopping hydraulic pressure PS deviates from the ideal stopping hydraulic pressure PO and the excessive braking force is applied to the vehicle upon the stop.

Before timing t21 at which the vehicle stops, the WC pressure Pwc in the wheel cylinder 21 is set to the hydraulic pressure corresponding to an amount of the braking operation by the driver's braking operation. When the vehicle stops at timing t21, the driver releases the braking operation. Then, the stop auxiliary control is executed. In this case, the hydraulic pressure instruction value PI is set to the holding hydraulic pressure that is a sum obtained by adding the offset value α to the stopping hydraulic pressure PS.

In the present embodiment, the holding hydraulic pressure PH1 is lower than the WC pressure Pwc upon the stop of the vehicle. For this reason, in the braking actuator 60, the differential pressure regulation valve 62 is actuated, based on the opening instruction value corresponding to the hydraulic pressure instruction value PI(=PH1). Then, the WC pressure Pwc is reduced to and held at the holding hydraulic pressure PH1 or a value close to the holding hydraulic pressure PH1. At this time, the WC pressure Pwc can be controlled without driving the pump motor 67, i.e., without actuating the pump 68.

In contrast, in Comparative Example, the holding hydraulic pressure PH2 is higher than the WC pressure Pwc upon the stop of the vehicle. For this reason, in the braking actuator 60, the differential pressure regulation valve 62 is actuated, based on the opening instruction value corresponding to the hydraulic pressure instruction value PI(=PH2) while driving the pump motor 67 to actuate the pump 68. Then, the WC pressure Pwc is increased to and held at the holding hydraulic pressure PH2 or a value close to the holding hydraulic pressure PH2. Then, when the WC pressure Pwc is held after timing t22, the driving of the pump motor 67 is stopped.

That is, in the present embodiment, since the stopping hydraulic pressure PS can be optimized, it is possible to prevent a situation in which the pump motor 67 is uselessly driven when controlling the WC pressure Pwc by the stop auxiliary control. As a result, it is possible to reduce the drive time of the pump motor 67 and to reduce the drive frequency of the pump motor 67. Thereby, it is possible to reduce loads of the pump motor 67 and the pump 68, and to reduce occurrence of actuation noises of the pump 68.

In the meantime, the embodiment can be appropriately changed and implemented in following forms.

- In the embodiment, the control device 100 configured to execute the automatic braking control including the stop auxiliary control has been exemplified. As the automatic braking control, the stop auxiliary control is not necessarily required.
- In the correction of the plant model 104 described with reference to FIG. 7, the extra hydraulic pressure Pr may be derived by adding a correction term K2 to the front and back pitch amount G calculated from the plant model 104, instead of inputting the correction term K1 to the plant model 104. In this case, the correction term K2 having the same unit as the front and back pitch amount G is derived, based on the deviation quantity between the state quantity of the vehicle and the ideal value of the state quantity of the vehicle (for example, the variation width ΔGx of the acceleration Gx, the variation width ΔJ of the jerk degree J, and the reaction time Ti). Then, the extra hydraulic pressure Pr is derived, based on the front and back pitch amount G output from the plant model 104 and the correction term K2. Also in this case, the extra hydraulic pressure Pr can be obtained, considering the variation and aging changes in performance of the differential pressure regulation valve 62 of the braking actuator 60 and the variation in performance and aging changes in output of the acceleration sensor 93.
- In the meantime, even in the case in which the correction term K2 is used, the extra hydraulic pressure Pr may be derived, based on a product obtained by multiplying the correction term K2 by the coefficient corresponding to the reliability, and the front and back pitch amount G output from the plant model 104.
- In the embodiment, in the correction of the plant model 104, the correction term K1 is input to the plant model 104 after being multiplied by the coefficient corresponding to the reliability. As the applying aspects of the correction term K1, K2, when the reliability is equal to or smaller than a prescribed value, the derivation of the extra hydraulic pressure Pr using the correction term K1, K2 may not be performed, and when the reliability is larger than the prescribed value, the derivation of the extra hydraulic pressure Pr using the correction term K1, K2 may be performed.
- The correction term K1, K2 may be used for derivation of the extra hydraulic pressure Pr without multiplying the correction term K1, K2 by the coefficient corresponding to the reliability. That is, the value of the correction term K1, K2 may be always input 100%, irrespective of the magnitude of the reliability.
- In the embodiment, when there is the smooth stop history, the stopping hydraulic pressure PS is set, based on the soft stop hydraulic pressure PA stored in the memory, even though the road surface gradient RG, which is the gradient of the road surface on which the vehicle is currently located, is different from the value of the road surface gradient upon the successful smooth stop. However, when the road surface gradient RG, which is the gradient of the road surface on which the vehicle is currently located, is different from the value of the road surface gradient upon the successful smooth stop, the value of the estimated hydraulic pressure Pe calculated using the plant model 104 may be set as the stopping hydraulic pressure PS, even though there is the smooth stop history.
- In the embodiment, the plant model 104 is used to derive the extra hydraulic pressure Pr that is a value correlated with the deviation quantity between the stopping hydraulic pressure PS and the ideal stopping hydraulic pressure PO. However, the extra hydraulic pressure Pr or the estimated hydraulic pressure Pe may be derived by other methods in which the plant model 104 is not used.
- When calculating the estimated hydraulic pressure Pe, the proper estimated hydraulic pressure Pe for keeping the vehicle stopped may be calculated by acquiring information about a road surface of a traveling destination of the vehicle and position information about a preceding vehicle.
- When it can be determined that there is no change in weight of the vehicle even though the door or window is opened, the deletion of the smooth stop history, the OFF setting of the correction flag and the initialization of the reliability may not be performed.
- During the starting time control and the automatic stop control, the value of the estimated hydraulic pressure Pe derived using the plant model 104 may be set as the stopping hydraulic pressure PS, irrespective of whether or not the smooth stop history is stored. That is, when it is determined in step S101 that the vehicle is being decelerated (S101: YES), the processing may proceed to step S103. Likewise, when it is determined in step S202 that the road surface is a downhill road (S202: YES), the processing may proceed to step S204.
- The offset value a that is used when calculating the holding hydraulic pressure PH may be a preset predetermined value or a value that varies in correspondence to an expected value of the duration of the stop state.
- The braking device 40 may have a configuration different from the device described in the embodiment, inasmuch as it can automatically adjust the WC pressure Pwc in the wheel cylinder 21.
- The braking device may have a configuration different from the device described in the embodiment, inasmuch as it can automatically adjust the force of pressing the frictional material to the rotary body configured to rotate integrally with the wheel 10. As the braking device, for example, an electric braking device capable of pressing the frictional material to a rotary member by force corresponding to drive of an electric motor may be exemplified.

The invention claimed is:

1. A braking control device for a vehicle, which is to be applied to a vehicle having a braking device configured to be able to adjust a braking force to be applied to the vehicle, the braking control device for a vehicle comprising:
processing circuitry configured to
control the braking device so as to apply a stopping braking force to the vehicle, as a minimum value of the braking force required to keep the vehicle stopped;
derive a deviation quantity between a state quantity of the vehicle obtained in a state in which the stopping braking force is applied to the vehicle and an ideal value of the state quantity of the vehicle, based on a vehicle behavior upon shifting a stop state to a traveling state of the vehicle by reducing the braking force applied to the vehicle; and
update the stopping braking force to an updated stopping braking force on a basis of the deviation quantity, when shifting the vehicle from the traveling state to a next stop state,
wherein when updating the stopping braking force, the stopping braking force is updated so that variation per unit time of vehicle acceleration upon shift from the next stop state to the traveling state of the vehicle is to be smaller.

2. The braking control device for a vehicle according to claim 1, wherein the processing circuitry derives the deviation quantity, based on a time period from a point in time at which the braking force starts to be reduced to a point in time at which the vehicle shifts to the traveling state.

3. The braking control device for a vehicle according to claim 2, wherein the processing circuitry controls the braking device so as to apply the updated stopping braking force.

4. The braking control device for a vehicle according to claim 1, wherein the processing circuitry controls the braking device so as to apply the updated stopping braking force.

5. A braking control device for a vehicle, which is to be applied to a vehicle having a braking device configured to be able to adjust a braking force to be applied to the vehicle, the braking control device for a vehicle comprising:
processing circuitry configured to
control the braking device so as to apply a stopping braking force to the vehicle, as a minimum value of the braking force required to keep the vehicle stopped;
derive a deviation quantity between a state quantity of the vehicle obtained in a state in which the stopping braking force is applied to the vehicle and an ideal value of the state quantity of the vehicle, based on a vehicle behavior upon shifting a stop state to a traveling state of the vehicle by reducing the braking force applied to the vehicle; and
update the stopping braking force to an updated stopping braking force on a basis of the deviation quantity, when shifting the vehicle from the traveling state to a next stop state,
wherein, the processing circuitry derives the deviation quantity, based on a time period from a point in time at which the braking force starts to be reduced to a point in time at which the vehicle shifts to the traveling state.

6. The braking control device for a vehicle according to claim 5, wherein the processing circuitry controls the braking device so as to apply the updated stopping braking force.

7. A braking control device for a vehicle, which is to be applied to a vehicle having a braking device configured to be able to adjust a braking force to be applied to the vehicle, the braking control device for a vehicle comprising:
processing circuitry configured to
control the braking device so as to apply a stopping braking force to the vehicle, as a minimum value of the braking force required to keep the vehicle stopped;
derive a deviation quantity between a state quantity of the vehicle obtained in a state in which the stopping braking force is applied to the vehicle and an ideal value of the state quantity of the vehicle, based on a vehicle behavior upon shifting a traveling state to a stop state; and
update the stopping braking force to an updated stopping braking force on a basis of the deviation quantity, when shifting the vehicle from the stop state to a next traveling state by reducing the braking force applied to the vehicle,
wherein the processing circuitry derives the deviation quantity, based on a variation width of vehicle acceleration upon shifting from the traveling state to the stop state of the vehicle.

* * * * *